UNITED STATES PATENT OFFICE 2,543,049

RECOVERY OF PROTEINS FROM PLANT LEAVES AND STEMS

Joseph Naghski, Jonathan W. White, Jr., and Samuel R. Hoover, Philadelphia, Pa.

No Drawing. Application May 23, 1946,
Serial No. 671,718

3 Claims. (Cl. 195—4)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the recovery of a material rich in proteins from the cells of leaves and stems of plants having chlorophyll-bearing cell walls. This material, frequently referred to as "protoplast," is a material within the cell walls of leaves and stems comprising generally the protoplasm, thought to be a highly complex lipoid-protein emulsion, salts, sugars, nucleus, chloroplasts and other plastids, and such water-insoluble substances as oil, resin, rubber and carotene.

The walls of the cells are complex structures containing cellulose, hemicellulose, protopectin and other constituents.

One procedure according to the prior art for obtaining protoplasts of plant leaves and stems involves altering the walls of the cells permeability or physically to break them. The most common method employed involves grinding the plant material to such a degree of fineness that the individual walls are broken, thus making the protoplasts available to separation by chemical or physical action, such as by the use of solvents. An objection to this procedure is that it is virtually impossible to break each cell wall, thus making for a long extraction process. Furthermore, the fineness of cut necessarily causes difficulty with filtration or percolation of the solvent through the comminuted plant material.

Plant leaf proteins found in the protoplast are of excellent nutritive quality. However, no practical method has heretofore been available for the isolation or concentration of such plant leaf proteins on a large scale. Little is known of the physical characteristics of leaf proteins, and because of their unavailability, little is known of their possible industrial applications.

In general, according to the invention, plant leaves and stems are fermented to disintegrate the chlorenchyma (chlorophyll-bearing) cell walls, with certain micro-organisms capable of digesting these walls, in such a manner that the protoplasts within them, and other materials in intimate mixture with the protoplasts, are not destroyed and are released from the leaves and stems either as a direct result of the fermentation or by added mild mechanical action, such as shaking or stirring, and are then recovered from the fermentation mash.

More particularly, leaves in water may be incubated with Clostridia, especially *Clostridium roseum*, under conditions in which oxygen is essentially excluded, resulting in rapid fermentation. A temperature of 40°–45° C. has been found to be the optimum for fermentation with this organism. This fermentation is characterized by an initial evolution of gaseous products. The leaves are distended by the gas accumulating within them, and the epidermis may even separate completely from the veins and parenchyma. Concurrently, the cell walls of the parenchyma are digested. At this stage the protoplasts have become coagulated, if they were not so in the original leaf, and they either fall out of the residuum or can be released by mild mechanical action.

Separation of the released protoplasts from the residuum may be accomplished by screening the fermented slurry. The protoplasts and liquid pass through the screen while the structural leaf constituents are retained. The protoplasts, which are heavier than the liquid, settle out. It is desirable but not essential that the protoplasts be washed with water and separated therefrom by decantation or centrifugation at this point. By this procedure, a thick slurry of protoplasts is obtained which can be used without drying or which can be dried and then utilized as desired.

As an example of the application of the invention, 746 g. of dry leaves of broccoli, containing about 0.3 g. carotene, (400 micrograms per g. of dry matter) and approximately 15.5% of leaf protein, was steamed for 10 minutes, cooled with water, drained and fermented anaerobically with 10% of its volume of an active culture of *Clostridium roseum*. At the end of three days, the fermented mash was shaken and passed over 20 and 80 mesh screens. The remaining leaf and stem tissues on the screens were diluted with water, stirred vigorously and again screened, yielding an additional quantity of protoplasts. The protoplast suspension passing through the screens was combined and settled overnight in a cold room, the supernatant liquid was removed, fresh water was added and, after standing overnight, the supernatant liquid was again removed. The settled materials remaining after removal of the supernatant liquid were recovered by centrifugation and dried in a current of warm air.

The dried material was olive in color, weighed 297.8 g., contained 42.4% of protein and 0.55 g. of carotene (1900 micrograms per g.). This corresponds to an increase in concentration over the original leaves of threefold for the protein and fivefold for the carotene. The apparent increase in total carotene was due to the inextractability of all the carotene from the original lead used in making the tests.

The material remaining on the screens, consisting mostly of pieces of cuticle and of vascular tissue, was also dried, and weighed 22.5 g.

By like procedure, the protoplasts were isolated from *Cryptostegia grandiflora*, goldenrod, bluegrass, wild lettuce, bean leaves, rhubarb, lettuce, alfalfa, turnip tops, beet tops and pea vines. In each case, a suspension of protoplasts was obtained, being easily separated by screening from the residual cuticle and duct material.

By the use of the fermentation process described above, it is possible to produce a material which is rich in protein, carotene, vitamins, minerals, and other desirable plant constituents, and which at the same time is relatively free of cellulosic and lignin materials. This material is useful as a nutritive supplement for enrichment of diets. It is also useful as an enriched starting material for the isolation or production of its components, for example, the production of leaf protein, carotene or lipids.

By the method, it is also possible to separate the ether soluble components present in the protoplasts from those present in the cuticle by extracting the protoplasts with ether.

If the crude plant material is first extracted well with boiling water, the fermentation is greatly aided, the time necessary for proper fermentation is cut in half, and no nutrients beyond those present in the 10% inoculum are required. Under these conditions, a slurry of whole or cut leaves in water, at a concentration of 7% solids (calculated on the original unleached weight), can be fermented in two days. A fermentation which proceeds with such rapidity may well be carried out as a continuous process.

The type of agitation best suited for releasing the protoplasts from the fermentation mash has been investigated. The action of a small experimental paper beater is too severe, for considerable comminution of the vein and cuticle tissue is obtained. Shaking the slurry in a half-filled bottle on a shaking machine or stirring it with a mild mechanical action gives the desired effect. The optimum time of agitation of course depends upon the shape and size and rotation rate of the stirrer and of the container and on the extent of fermentation. Sixteen gallons of slurry agitated three minutes in a barrel with an 8-inch propeller type stirrer operating at 430 R. P. M. gives excellent results.

The separation of the protoplasts from the fermentation mash has been carried out on a 52 by 72 mesh vibrating screen. The larger particles are retained on the screen and the protoplasts pass through. Protoplasts entrapped in the mass on the screen can be washed through with a spray of water and a separation of over 80% of the total protoplasts is thus obtained in one pass. Since from 50% to 65% of the original leaf material is rendered soluble or removed, the total fermented material, without preliminary screening, can be dried and used as an enriched (twofold or more) material for direct utilization or extraction of its components.

The protoplasts settle rather readily out of the suspension obtained after the screening. After the suspension has been left overnight, the supernatant liquid can be siphoned off or decanted. The residual suspension is 4% to 7% solids, and can be centrifuged or filtered to concentrate the solids. The relatively complete removal of bacterial cells and dissolved solids by diluting the suspension with water and settling it again is advantageous. The addition of a polyvalent cation, for example, aluminum, in proper concentration will cause a more rapid settling of the protoplasts.

The drying of the protoplasts either with or without previous centrifugation or washing can be accomplished by any desirable process.

The desired type of fermentation under anaerobic conditions has been brought about by other appropriate organisms. *Clostridium felsineum* was found to be very active in the liberation of protoplasts when tested on cryptostegia leaves.

A culture of a thermophyllic cellulose fermenter isolated from horse manure and belonging to the genus Clostridium was found to liberate protoplasts from cryptostegia leaves. This unidentified Clostridium differs from *C. roseum* and *C. felsineum* in that it has an optimum temperature at 60° C. while 50° C. is the limiting temperature for the liberation of protoplasts by *C. roseum* and *C. felsineum*.

The desired type of fermentation can also be brought about under aerobic condition by means of appropriate organisms. For example, cryptostegia leaves were fermented in Allisons medium at 32–34° C. by the natural bacterial flora. Aerobic conditions were maintained by vigorous ingress of air into the suspension. Examination of the fermented material showed that protoplasts were liberated.

The desired type of fermentation can also be brought about under aerobic conditions by means of molds. *Chaetomium globosum*, *Aspergillus fumigatus* and *Trichoderma sp.* were found to effect the liberation of protoplasts from cryptostegia leaves.

Having thus described the invention, what is claimed is:

1. A process for the recovery of a material rich in proteins from the leaves and stems of plants having chlorophyll-bearing cell walls comprising fermenting the leaves and stems with a culture of *Clostridium roseum* sufficiently to release the material from the cells, and recovering the material from the fermentation mash.

2. A process for the recovery of a material rich in proteins from the leaves and stems of plants having chlorophyll-bearing cell walls comprising fermenting the leaves and stems with a culture of *Clostridium roseum* sufficiently to release the material from the cells, and recovering the material by agitating the fermentation mash to detach the material from remaining leaf and stem tissues, and separating the material from the remaining tissues.

3. A process for the recovery of a material rich in proteins from the leaves and stems of plants having chlorophyll-bearing cell walls comprising extracting the leaves and stems with boiling water, fermenting the extracted leaves and stems with a culture of *Clostridium roseum*, and recovering the material by screening the fermented mash, settling the material passing through the screen, and separating the settled material containing the proteins from the supernatant liquid.

JOSEPH NAGHSKI.
JONATHAN W. WHITE, JR.
SAMUEL R. HOOVER.

REFERENCES CITED

The following references are of record in the file of this patent:

UNITED STATES PATENTS

| Number | Name | Date |
|---|---|---|
| 2,408,853 | Hoover et al. | Oct. 8, 1946 |

FOREIGN PATENTS

| Number | Country | Date |
|---|---|---|
| 45,744 | Norway | Oct. 22, 1928 |
| 336,477 | Italy | Feb. 17, 1936 |

OTHER REFERENCES

Chemical Abstracts, vol. 37: 5595$^1$.
Chemical Abstracts, vol. 35: 7199$^6$.
Bergey's Manual of Determinative Bacteriology, 6th ed., 1948.